(12) United States Patent
Handerek

(10) Patent No.: US 11,815,372 B2
(45) Date of Patent: Nov. 14, 2023

(54) DISTRIBUTED OPTICAL FIBRE VIBRATION SENSOR

(71) Applicant: VIAVI SOLUTIONS INC., Chandler, AZ (US)

(72) Inventor: Vincent Handerek, Fleet (GB)

(73) Assignee: VIAVI SOLUTIONS INC., Chandler, AZ (US)

( * ) Notice: Subject to any disclaimer, the term of this patent is extended or adjusted under 35 U.S.C. 154(b) by 226 days.

(21) Appl. No.: 17/057,332

(22) PCT Filed: Apr. 5, 2019

(86) PCT No.: PCT/GB2019/051012
§ 371 (c)(1),
(2) Date: Nov. 20, 2020

(87) PCT Pub. No.: WO2019/224511
PCT Pub. Date: Nov. 28, 2019

(65) Prior Publication Data
US 2021/0190550 A1    Jun. 24, 2021

(30) Foreign Application Priority Data

May 22, 2018   (GB) .................................... 1808366

(51) Int. Cl.
*G01D 5/353* (2006.01)
*G01H 9/00* (2006.01)
(Continued)

(52) U.S. Cl.
CPC ......... *G01D 5/35361* (2013.01); *G01H 9/004* (2013.01); *G01K 11/32* (2013.01); *G01L 11/025* (2013.01)

(58) Field of Classification Search
CPC .... G01D 5/35361; G01H 9/004; G01K 11/32; G01L 11/025
See application file for complete search history.

(56) References Cited

U.S. PATENT DOCUMENTS

2008/0084914 A1    4/2008  Yamamoto et al.
2015/0211900 A1    7/2015  Xue et al.
(Continued)

FOREIGN PATENT DOCUMENTS

| GB | 2538282 A | 11/2016 |
| JP | 2010-127705 A | 6/2010 |

(Continued)

OTHER PUBLICATIONS

Ayre, "Measurement of Longitudinal Strain in Optical Fiber Cables during Installation by Cable Ploughing," *J. Lightwave Technology*, LT-4(1): 15-21 (Jan. 1986).

(Continued)

*Primary Examiner* — Thanh Luu
(74) *Attorney, Agent, or Firm* — Mannava & Kang, P.C.

(57) ABSTRACT

A distributed optical fibre sensor is discussed which is arranged to detect acoustic vibration and at least a first of two or more other measurands, which could be for example two or more of changes in temperature, changes in static pressure, and changes in static strain. At least first and second optical waveguides are arranged to have optical path length response characteristics to at least one of the other measurands which are different from each other, and an analyser is arranged to determine at least said first other measurand using differences between the interference signals from each of the optical waveguides.

30 Claims, 4 Drawing Sheets

(51) Int. Cl.
  G01K 11/32    (2021.01)
  G01L 11/02    (2006.01)

(56) References Cited

U.S. PATENT DOCUMENTS

| | | | |
|---|---|---|---|
| 2016/0040527 A1 | 2/2016 | Balagopal et al. | |
| 2018/0052102 A1* | 2/2018 | Yaman | G01K 11/32 |
| 2018/0113037 A1* | 4/2018 | Molteni | G01D 5/35361 |
| 2018/0364073 A1* | 12/2018 | Alemohammad | G01D 5/35358 |
| 2020/0124489 A1* | 4/2020 | Godfrey | G01D 5/35361 |

FOREIGN PATENT DOCUMENTS

| | | |
|---|---|---|
| WO | WO 2008/056143 A1 | 5/2008 |
| WO | WO 2012/063066 A2 | 5/2012 |
| WO | WO 2012/076873 A2 | 6/2012 |
| WO | WO 2015/163963 A2 | 10/2015 |
| WO | WO 2016/012760 A2 | 1/2016 |
| WO | WO 2016/174410 A1 | 11/2016 |
| WO | WO 2017/096421 A1 | 6/2017 |

OTHER PUBLICATIONS

Bao et al., "Recent Progress in Distributed Fiberoptic Sensors," *Sensors*, 12: 8601-8639 (2012).

Bolognini et al., "Fiber-Optic Distributed Sensor Based on Hybrid Raman and Brillouin Scattering Employing Multiwavelength Fabry-Pérot Lasers," *IEEE Photonics Tech. Letters*, 21(20): 1523-1525, Oct. 15, 2009.

Budiansky et al., "Pressure Sensitivity of a Clad Optical Fiber," *Applied Optics*, 18(24): 4085-4088 (Dec. 15, 1979).

Bucaro et al., "Measurement of Sensitivity of Optical Fibers for Acoustic Detection," *Applied Optics*, 18(6): 938-940 (Mar. 15, 1979).

Butter et al., "Fiber Optics Strain Gauge," *Applied Optics*, 17(18): 2867-2869 (Sep. 15, 1978).

Gu et al., "Simultaneous Measurement of Pressure and Temperature Using Dual-Path Distributed Brillouin Sensor," *Applied Optics*, 54(11): 3231-3235 (Apr. 10, 2015).

Hill et al., "Gain in Hydrostatic Pressure Sensitivity of Coated Fibre Bragg Grating," *Electronics Letters*,35(15) (Jul. 22, 1999).

Hocker, "Fiber Optic Acoustic Sensors with Composite Structure: An Analysis," *Applied Optics*, 18(21): 3679-3683 (Nov. 1, 1979).

Hocker, "Fiber-Optic Sensing of Pressure and Temperature," *Applied Optics*, 18(9): 1445-1448 (May 1, 1979).

Huang et al., "Perturbation Effects on Mode Propagation in Highly Elliptical Core Two-Mode Fibers," *J. Lightwave Tech.*, 8(1): 23-33 (Jan. 1990).

Hughes et al., "Static Pressure Sensitivity Amplification in Interferometric Fiber-Optic Hydrophones," *Applied Optics*, 19(1): 98-107 (Jan. 1, 1980).

Kishida et al., "Study of Optical Fibers Strain-Temperature Sensitivities Using Hybrid Brillouin-Rayleigh System," *Photonic Sensors*, 1(4): 1-11 (2014).

Lagakos et al., "Temperature-Induced Optical Phase Shifts in Fibers," *Applied Optics*, 20(13): 2305-2308 (Jul. 1, 1981).

Miah et al., "A Review of Hybrid Fiber-Optic Distributed Simultaneous Vibration and Temperature Sensing Technology and Its Geophysical Applications," *Sensors*, 17, 2511: 1-25 (Nov. 1, 2017).

Morey et al., "Separation of Temperature and Strain Measurands in Fiber Bragg Grating Sensors," *LEOS '92, IEEE Lasers and Electro-Optics Society*, pp. 454-455 (1992).

Othonos, "Bragg Gratings in Optical Fibres: Fundamentals and Applications" *Optical Fiber Sensor Technology Advanced Applications—Bragg Gratings and Distributed Sensors*, Grattan and Meggitt (eds.), Kluwer, Dordrecht (2000).

Parker et al., "Simultaneous Distributed Measurement of Strain and Temperature from Noise-Initiated Brillouin Scattering in Optical Fibers," *IEEE J. of Quantum Elec.*, 34(4): 645-659 (Apr. 1998).

Posey et al., "Strain Sensing Based on Coherent Rayleigh Scattering in an Optical Fibre," *Electronic Letters*, 36(20): 1688-1689 (Sep. 28, 2000).

Rajan et al., "A Photonic Crystal Fiber and Fiber Bragg Grating-Based Hybrid Fiber Optic Sensor System," *IEEE Sensors J.*, 12(1): 39-43 (Jan. 2012).

Yang, "Combining Optical Effects of Axial Strain, Thermal Loading, and Hydrostatic Pressure in Tightly Jacketed Double-Coated Optical Fibers," *Optical Engineering*, 40(10): 2107-2114 (Oct. 2001).

United Kingdom Intellectual Property Office, Search Report in United Kingdom Patent Application No. GB1808366.7, 1 p. (dated Dec. 14, 2018).

United Kingdom Intellectual Property Office, Search Report in United Kingdom Patent Application No. GB1808266.7, 1 p. (dated Dec. 14, 2018).

European Patent Office, International Search Report in International Patent Application No. PCT/GB2019/051012, 3 pp. (dated Jun. 25, 2019).

European Patent Office, Written Opinion in International Patent Application No. PCT/GB2019/051012, 6 pp. (dated Jun. 25, 2019).

* cited by examiner

DISTRIBUTED OPTICAL FIBRE VIBRATION SENSOR

CROSS-REFERENCE TO RELATED APPLICATIONS

This application is a national phase application of International Patent Application No. PCT/GB2019/051012, filed Apr. 5, 2019, which claims priority to United Kingdom Patent Application No. GB 1808366.7, filed May 22, 2018, both of which are incorporated by reference herein in their entireties for all purposes.

The present disclosure relates to a distributed optical fibre sensor arranged to detect vibration and one or more other measurands such as changes in temperature, pressure, and static strain

INTRODUCTION

Distributed optical fibre sensing, using probe light reflection from the intrinsic material of a sensing optical fibre along a path through an environment, is a well known approach for providing information about environmental conditions surrounding the sensing optical fibre, and avoids the need to use point sensor structures at particular locations such as sensor structures coupled to the optical fibre, or Bragg gratings written into the optical fibre. Fully distributed optical fibre sensing can, in principle, provide spatially resolved information from every point along the sensing optical fibre. Variables that can be sensed include temperature, static strain, pressure, and vibration.

One such technique that can be used to detect fairly rapid variations in optical path length, induced by a physical forcing such as acoustic vibration, is to use the coherent Rayleigh noise profile of light backscattered within a sensing optical fibre interrogated by an optical source of limited bandwidth. Such Rayleigh noise profiles arise from interference between the many components of the backscattered light originating from different points along a portion of the sensing optical fibre illuminated by the optical source. Such techniques are described, for example, in WO2008/056143. Other Rayleigh backscatter and other optical techniques such as Brillouin scattering can also be used.

Such techniques can also be used to detect physical forcings acting generally over longer time scales and at lower frequencies than acoustic vibration, such as changes in temperature, which also give rise to variations in optical path length along the sensing optical fibre, for example as described in WO2016/174410. However, there may be multiple such longer time scale physical forcings which can have an effect on optical path length of the sensing optical fibre, such as hydrostatic pressure and static strain in addition to temperature, so if it is desired to measure one or more of these accurately, it may be challenging to distinguish them from each other in their effect on optical path length and hence on interference or other spectral signals used by a sensor.

It would be desirable to address problems and limitations of the related prior art.

SUMMARY OF THE INVENTION

Embodiments of the invention provide a multi-parameter, fully distributed optical fibre sensor that employs only a single optical scattering mechanism for system simplicity and delivers rapid readout rates allowing one of the sensed parameters to be vibration. The optical scattering mechanisms employed may typically be Rayleigh scattering, for example coherent Rayleigh scattering, although other techniques and scattering mechanisms such as Brillouin scattering could be used. The other measurands to be sensed may include static or hydrostatic pressure, temperature, and axial strain.

Embodiments of the invention are also able to avoid unduly complicated structures to provide the sensing cable or similar structure, for example avoiding discontinuous mechanical components or optical loopback arrangements. Aspects of the invention can also be implemented using widely available and economic optical fibre types such as those used in long-distance telecommunication cables, thereby reducing costs. Suitable optical fibres could include for example axisymmetric, single-mode fibre types without special polarisation control features. Multi-core telecommunication fibres may also be appropriate if available at low cost, and a wide variety of other optical fibre and optical waveguide types may be used if desired and depending on details of the particular implementation, for example using various kinds of double clad and multicore optical fibres.

Embodiments of the invention are therefore able to achieve fully distributed sensing for vibration and other measurands along one or more optical fibres sharing the same sensing environment, scattering mechanism and interrogator equipment, where each of two or more optical waveguides provided by the one or more optical fibres typically provides some response to all of the parameters of interest, but where each optical waveguide provides distinctly different response characteristics (for example in the form of a response coefficient or response function) to at least one of the parameters to be sensed, when compared to the other optical waveguides.

The number of optical waveguides required is typically at least equal to the number of other measurands to be sensed. The optical waveguides may typically be included as separate fibres in a single sensing cable for convenience and minimum cost, although two or more of the optical waveguides may be included within a single optical fibre which may provide improved performance for example in terms of these optical waveguides experiencing very similar measurand fields such as of pressure, temperature, strain and vibration.

Differing response characteristics among the sensing optical waveguides for any given environmental measurand may typically be achieved by providing different optical fibres with a different coating configuration, in which any or all of coating materials, geometries and layer thicknesses may vary between the optical fibres, but where each coating configuration is preferably constant along any given fibre.

The use of multi-core optical fibres as mentioned above to accommodate multiple waveguides in a single optical fibre would typically require non-circular cross-sectional coating geometries to be employed.

Aspects of the invention may employ matrix mathematics, optionally in combination with other methods such as signal filtering in the spectral domain, to recover the required vibration and other measurand(s) as functions of time and of distance along the optical waveguides from the set of backscatter signals.

The invention therefore provides, according to one aspect, a distributed optical fibre sensor arranged to detect vibration, for example acoustic vibration, and at least a first of two or more other measurands, the sensor comprising: at least first and second optical waveguides extending proximally to each other along a common path through an environment; a probe light source arranged to deliver probe light to the optical waveguides for backscatter within the optical waveguides; a detector arranged to detect, as functions of distance along the common path, signals in the backscattered light resulting from changes in the optical waveguides arising from the acoustic vibrations and the other measurands; and an analyser arranged to determine acoustic vibration and at least said first measurand, as functions of distance along the common path, from the signals. Note that the acoustic vibration may be determined from the signals from just one, some, or all of the optical waveguides.

More particularly, the signals may be interference signals resulting from changes in optical path length along the optical waveguides arising from the acoustic vibrations and other measurands, and such interference signals may be detected if the backscattered light is for example Rayleigh backscattered light.

However, the signals could instead be detected in light backscattered using a different backscatter mechanism, and the changes in the optical waveguides giving rise to the signals may be from changes other than in optical path length. In some embodiments for example, the detector could be arranged to detect, as functions of distance along the common path, spectral signals, for example the Brillouin spectral shift in Brillouin backscattered light. Such spectral signals could result for example from changes in strain and temperature within the optical waveguides.

Typically, the common path along which the optical waveguides extend may be of considerable length, for example at least 100 m or at least 1000 m, and the distributed optical fibre sensor may be arranged to determine said acoustic vibration and said at least one other measurand at a spatial resolution along the path of 30 m or less, for example less than 10 m.

In particular, one of the optical waveguides is arranged to have a response characteristic to at least one of the measurands which is different to that of another of the optical waveguides, and indeed each optical waveguide may be different in this respect to each other waveguide. The analyser is then arranged to determine at least said first measurand, and optionally further ones of the other measurands, using differences between the interference signals from each of the optical waveguides, where those differences result from the different response characteristics.

If the signals are interference signals resulting from changes in optical path length, then these response characteristics may be optical path length characteristics. If the signals are spectral signals for example detected from Brillouin backscatter then these response characteristics may be spectral characteristics such as Brillouin spectral shift.

For example, the other measurands may comprise two or more of changes in temperature, changes in pressure, and changes in strain. Measurands may alternatively be considered to be two or more of temperature, pressure, strain etc. Here, pressure may be referred to as static or hydrostatic pressure, for example to distinguish from dynamic changes in pressure such as those of an acoustic field, and strain may similarly be referred to as static strain.

For a backscatter type in which each optical waveguide responds through changes in optical path length to all of the other measurands, the different response characteristics may be used to remove the effect of one other measurand in the determination of another, as long as at least as many optical waveguides are used as the number of other measurands to which those waveguides are responsive. For example, the at least said first other measurand may be one or more of pressure compensated for temperature effects (and optionally strain effects), temperature compensated for pressure effects (and optionally strain effects) and so on. Essentially the same principle may apply for a backscatter type in which each optical waveguide responds through spectral changes, although additional features of such spectral changes may also be used to assist in separating the effects of the other measurands. For example, temperature and strain are known to have distinguishable effects on Brillouin Stokes and anti-Stokes scattering. Such additional features in Brillouin scattering are discussed for example in T. R. Parker et al., *IEEE Journal of Quantum Electronics*, Vol 34, No 4, April 1998, pp 645-659.

For example, the optical path length or other response characteristics of each optical waveguide to each of the other measurands may be considered to be linear or approximately linear, at least over a suitable operating range of the sensor. Such a response characteristic can therefore be approximated or described by a corresponding response coefficient. In order to determine a particular other measurand, the response coefficient of each optical waveguide is then arranged to be different, at least in respect of one of the other measurands.

The sensor, for example, the analyser mentioned above, may be arranged to determine acoustic vibration and at least said first measurand, as functions of distance along the common path, from interference phases in the interference signals, for example from temporal changes in optical phases of the interference signals arising from backscatter from the corresponding locations along the common path. To this end, the sensor may comprise a phase recovery processor arranged to determine the required interference phases or temporal changes in the interference signals for the corresponding locations.

The acoustic vibration may typically be determined from higher frequency components of the interference signals such as the phase parts of those signals, and the measurands from lower frequency components. Therefore, the sensor may be arranged to filter the interference signals, for example parts of those signals representing changes in optical phase, to provide higher frequency signals and lower frequency signals, and the analyser may then be arranged to determine acoustic vibration using the higher frequency signals and to determine at least the first measurand using the lower frequency signals.

This division into higher and lower frequency components may for example be implemented as a division on either side of a single threshold such as 1 Hz, 3 Hz or 10 Hz, or below a first threshold and above a second threshold where the low frequency range and high frequency range defined by these thresholds could be separate or overlapping. The division into higher and lower frequency components could also be by means of filter functions having gradual transitions between the desired regions. Various filtering methods, including recursive filters can be used.

The two or more of the optical waveguides may be provided as waveguides within one or more optical fibres, with those optical fibres extending along the path through the environment. For example, each waveguide could be provided in a separate optical fibre, or two or more of the waveguides could be combined into a single optical fibre such as a multi-core or multi-clad optical fibre.

The sensor may be constructed such that each of the optical waveguides is arranged, for example by means of one or more of construction, coatings, mountings, geometry and so forth, such that the optical path length response of the optical waveguide to at least one and optionally all of the other measurands is different to that of each of the other optical waveguides to the those measurands.

This can be achieved for example by providing different coatings on each of the optical fibres. Each different coating may comprise a layer of a single material, or a combination of two or more layers of different materials. Such layers may typically be of even thickness around each optical fibre, such that each layer is of a predefined thickness, but asymmetric thicknesses could be used.

The materials used for the coatings may typically be polymers, but other materials such as metals or amorphous or crystalline materials could be used as well or instead.

Each coating or layer may extend substantially along the optical fibre for a full length of the path for which the at least said first measurand is to be determined.

Some or all of the optical fibres extending along the path may be housed within a loose tube, and to this end the loose tube may be helically wound within a cable extending along the common path, which can further help isolate the optical waveguides from static strain which might otherwise be experienced along the axis of the path.

Such a loose tube may also be provided with an elliptical cross section, and this may help to enhance response of the optical waveguides contained within the loose tube to static pressure. The loose tube housing may be filled with a gel disposed around the one, two or more optical fibres, and this can help ensure an even response of the optical waveguides to temperature and other measurand changes while providing a relatively incompressible medium for effective transmission of static pressure.

A cable carrying one, some or all of the optical waveguides and optionally one or more loose tubes as mentioned above may comprise a strength member extending along the cable. A loose tube as mentioned above may then be helically wound around the strength member. At least one of the optical waveguides may be located outside of any loose tube, but be coupled or tightly coupled to the strength member so as to experience static strain along the axis of the path which can be transmitted to that optical waveguide by the strength member.

The probe light discussed above may in particular be backscattered within each of the optical waveguides by a Rayleigh backscatter mechanism, so as to give rise to the interference signal. In particular, by using pulses of probe light into each optical waveguide the functions of distance may be established by using an optical time domain reflectometry technique, although other schemes such as frequency domain, correlation domain, or tunable wavelength schemes could be used.

By using pulses of probe light which are each suitably coherent, the interference signals may be coherent Rayleigh backscatter interference signals, in which the backscatter forms temporal speckle patterns at the detector, and these speckle patterns change depending on changes in optical path length as a function of distance along the optical waveguide.

However, in some embodiments, other backscatter types can instead be used such as Brillouin or Raman backscatter. In such cases, the signals mentioned in this document as interference signals will typically instead be spectral signals reflecting spectral changes in the backscattered light such as movements of spectral peaks characteristic of the chosen backscatter mechanism and the material of the optical waveguides. These spectral signals will then result from the effects of the acoustic vibrations and other measurands on the optical waveguides, which will be arranged to have spectral responses to at least one of the other measurands which are different to each other and which are used to determine the at least said first measurand using differences between the spectral signals. The invention also provides a distributed optical fibre sensor as outlined above but more particularly arranged to detect temperature, hydrostatic pressure and acoustic vibration as a function of distance along a path through an environment to be detected, using interference in Rayleigh backscatter from within at least two optical fibres extending together along the path, the at least two optical fibres being arranged to provide a distinctly different interference response to at least one of temperature and hydrostatic pressure.

To this end, the sensor may be arranged to cross compensate the detection of temperature and hydrostatic pressure using the distinctly different responses of the at least two optical fibres, and the distinctly different responses of the at least two optical fibres are provided by using different coatings on the at least two optical fibres.

Similarly, the invention also provides a distributed optical fibre sensor as outlined above but more particularly arranged to detect temperature, hydrostatic pressure and acoustic vibration as a function of distance along a path through an environment to be detected, using spectral shifts in Brillouin backscatter from within at least two optical fibres extending together along the path, the at least two optical fibres being arranged to provide a distinctly different spectral shift response to at least one of temperature and hydrostatic pressure.

The invention also provides methods corresponding to the sensors and other apparatus described herein, for example a method of operating a distributed optical fibre sensor to detect acoustic vibration and at least a first of two or more other measurands, comprising: providing at least first and second optical waveguides extending proximally to each other along a path through an environment, each optical waveguide having response characteristic to at least one of the other measurands which is different to that of the other optical waveguides; delivering probe light to the optical waveguides for backscatter within the optical waveguides; detecting, as functions of distance along the common path, signals in the backscattered light resulting from changes in the optical waveguides arising from the acoustic vibrations and the other measurands; and determining acoustic vibration and at least said first measurand, as functions of distance along the path, from the signals, using differences between the signals from each of optical waveguides resulting from the different response characteristics.

The invention also provides computer program code arranged to put into effect one or more of the described aspects of the disclosure, for example of the analysis leading to determination of acoustic vibration and one or more of the other measurands, and one or more computer readable media carrying such computer program code. The invention also provides the described analyser and the associated data processing functionality independently of the other aspects of the disclosure required to form and detect the described interference or spectral signals.

BRIEF SUMMARY OF THE DRAWINGS

Embodiments of the invention will now be described, by way of example only, with reference to the accompanying drawings of which.

DETAILED DESCRIPTION OF EMBODIMENTS

Figure 1:
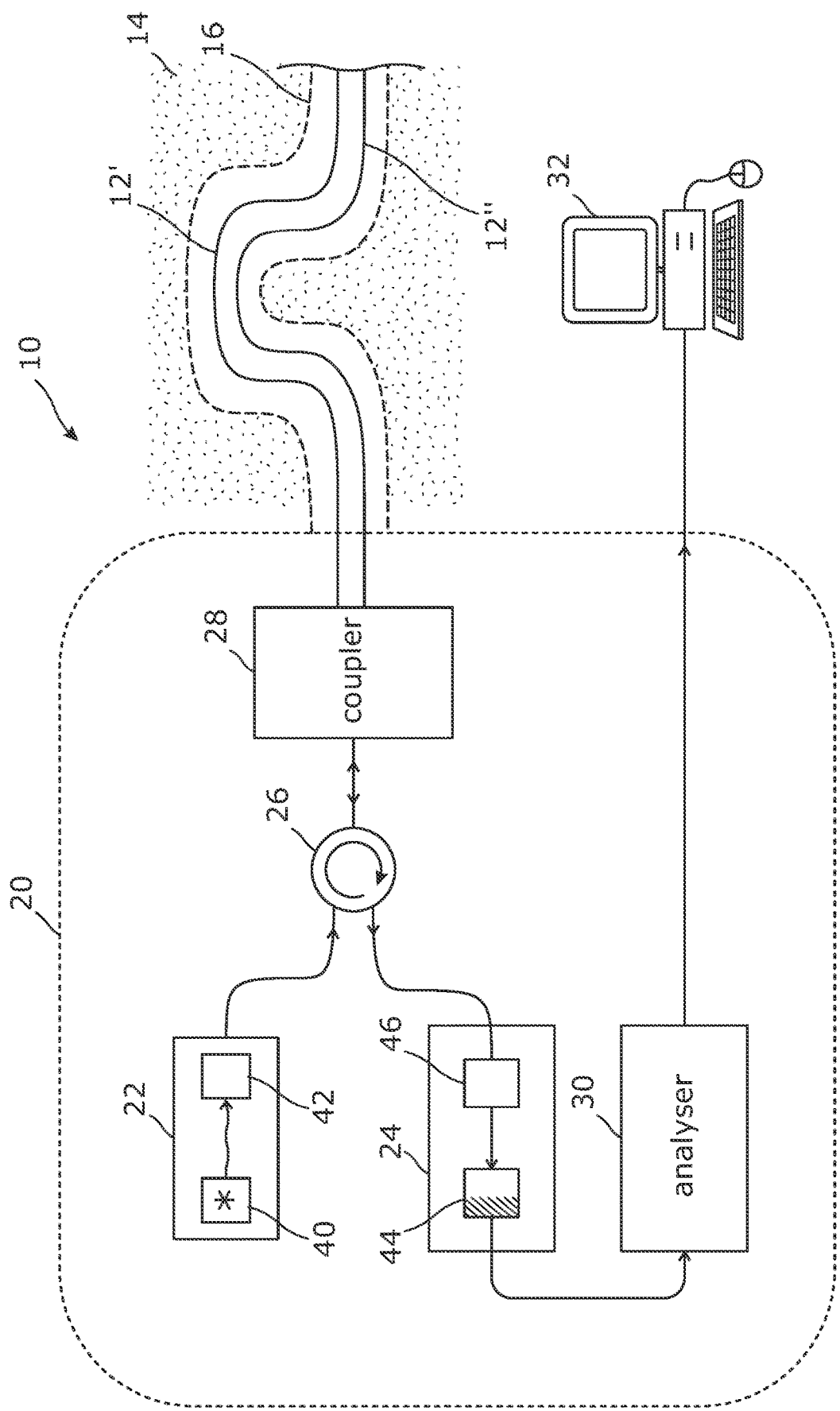
FIG. 1 schematically illustrates a fibre optic sensor embodying the invention.

Referring to FIG. 1 there is illustrated a distributed optical fibre sensor 10 comprising a plurality of optical waveguides 12', 12" co-extending along a path through an environment 14. The path could, for example, extend along an oil or gas well, adjacent to a pipeline or power cable under or above ground, along a built structure such as a bridge or building, within an aeroplane, along a security fence or perimeter, or in a variety of other situations or environments.

The plurality of optical waveguides will typically be provided using one or more optical fibres, and each such optical fibre may comprise one or more of the optical waveguides. Although only two such waveguides are illustrated in FIG. 1, three or more may be used. The waveguides may be installed within and extend along a sensing cable 16 (or multiple such sensing cables) which follows the path.

Other functional elements of the distributed optical fibre sensor illustrated in FIG. 1 may typically be consolidated within one or more interrogator units 20. These illustrated functional elements may include a probe light source 22 for generating probe light pulses for delivery into the optical waveguides 12', 12", and a detector 24 for detecting probe light which has been backscattered within the optical waveguides and received back at the interrogator 20.

An optical circulator 26 may be used to direct probe light pulses from the probe light source 22 on towards the optical waveguides, and to receive the backscattered light and direct it to the detector 24. A coupler 28 may be used to couple the circulator 26 to each of the plurality of optical waveguides 12', 12".

The detector 24 is arranged to detect, separately as functions of distance along each of the optical waveguides, signals in the backscattered light resulting from changes in the intrinsic material of the optical waveguides as corresponding functions of distance along the optical waveguides. These changes arise from corresponding acoustic vibrations and other measurands affecting the optical waveguides such as changes in one or more of temperature, static or hydrostatic pressure, and static strain. If Rayleigh scattering is being used then the changes will typically be in optical path length, and the signals will be interference signals. If Brillouin scattering is used then the changes will typically be in Brillouin shift and the signals will be spectral signals.

When we refer to static or hydrostatic pressure or static strain we are generally referring to these measurands which are varying more slowly than the corresponding acoustic or elastic propagation or oscillation modes typical of the surrounding environment. It is difficult to specify a precise boundary between acoustic vibration and static pressure and strain, but acoustic modes might typically be considered to be those oscillating at frequencies above about 1 to 10 Hz, and static modes might typically be considered to be those varying at frequencies below about 1 to 10 Hz. If a single frequency boundary is to be understood or used divide the acoustic and static regimes then a boundary frequency of 1 Hz, 3 Hz or 10 Hz could be used.

The signals from the detector are passed to an analyser 30 which is arranged to determine measures of the acoustic vibrations and of one or more of the other measurands from the interference or spectral data. Various processing of the signals, for example to carry out amplification, filtering, detect and follow phase changes or frequency peaks, and so forth, may take place at the detector, at the analyser, or elsewhere, as required to determine the acoustic vibration and other measurands. The analyser may typically be provided by one or more microprocessors or other computational arrangement with associated computer memory, and configured to operate as described herein using one or more suitable computer programs which may be provided as computer program code provided on one or more computer readable media.

The optical waveguides are configured or arranged such that at least one of the other measurands results in changes in optical path length or other characteristics such as Brillouin shift which are different for each of the optical waveguides. In other words, each optical waveguide responds differently to at least one of the other measurands, and therefore has a different corresponding response characteristic. Different ways in which these different response characteristics can be achieved, for example using optical fibre coatings and cable structures are discussed below. The analyser is then arranged to determine at least a first of the two or more other measurands using differences between the interference or spectral signals from each of the optical waveguides. The analyser is also arranged to determine acoustic vibration from the same signals from one or more of the waveguides.

If the response characteristics of each optical waveguide to each other measurand is substantially linear over an operating range of the sensor, and can therefore be described by a corresponding response coefficient, then the analyser can determine at least a first of the other measurands if the response coefficient of each optical waveguide to at least one of the measurands is different, for example see equation (1) below.

The determined measures of acoustic vibration and of the at least first other measurand may be passed to a personal computer 32 or other device for storage, display, further processing, and so forth as desired. Aspects of the sensor such as the analyser and data processing functions of the detector may be implemented partly or wholly in such a device or multiple such devices.

In order for the detector 24 to detect interference or spectral signals in the backscattered light separately for each of the optical waveguides, it may be convenient to use a coupler 28 which acts as a demultiplexer of probe light pulses into the plurality of optical waveguides, and as a multiplexer of the backscattered light for directing onto the coupler 26 and detector 24. This demultiplexing and multiplexing may be achieved by using a time division scheme in which in which a series of probe light pulses are generated sequentially and directed in some appropriate ordering into each of the optical waveguides 12', 12", or using a wavelength divisional scheme in which probe light pulses of different wavelengths are generated by the probe light source (for example from a single tunable laser or multiple lasers) and directed into the optical waveguides according to wavelength. The detector 24 may then be provided with a further demultiplexing arrangement if necessary in order to separately detect the backscattered light from each optical waveguide.

To this end, the probe light source may comprise one or more laser sources 40 and associated source conditioning optics 42, and the detector 24 may comprise one or more detector elements 44 and suitable detector conditioning optics 46. Some examples of how suitable wavelength division multiplexing into multiple optical waveguides can be achieved are described in WO2012/076873, and some examples of how suitable time division multiplexing can be used are described in WO2016/012760, and the contents of these documents is herein incorporated by reference for these and all other purposes.

Although FIG. 1 illustrates the use of a single probe light source and a single detector 24 for separately detecting backscatter from each of a plurality of optical waveguides, a separate probe light source and/or a separate detector 24 could instead be used if desired, for each, or for a subset, of the optical waveguides.

Although the optical waveguides may be implemented in various ways, it may be preferable to use commonly available optical fibres for this purpose, such as single mode or multimode silica optical fibres frequently used for telecommunications purposes. Probe light pulses having wavelengths in the region of 1528 to 1562 nm may conveniently be used so as to lie in the operating band of erbium doped fibre amplifiers, and the probe light source may be implemented using one or more narrow band lasers. If the probe light is pulsed, for example if optical time domain reflectometry is used to provide functions of distance along the optical waveguides, then pulse lengths within the optical waveguides of around a few metres in length may typically be used to achieve corresponding spatial resolution of the sensor along the path. The optical waveguides may typically extend along the path for distances in the region of tens of metres to a few kilometres.

The sensor may be operated by making use of a single scattering mechanism of the probe light, although this could be any of variety of scattering mechanisms including Rayleigh scattering and Brillouin scattering. If Rayleigh scattering is used then the detector 24 is typically arranged to detect an interference signal in the backscattered light, and the acoustic vibration and other measurands are determined from that interference signal. If an inelastic scattering mechanism such as Brillouin or Raman scattering is used, then detector 24 may instead be used to detect spectral features of the backscattered light which are responsive to influences on the optical waveguides of the acoustic vibration and measurands. For example, since Brillouin scattering within an optical fibre is dependent on both strain and temperature, the same techniques as described elsewhere in this document for causing a plurality of optical waveguides to respond differently to measurands such as temperature and pressure can also be used for a corresponding sensor arranged to use Brillouin scattering instead of Rayleigh scattering.

The distributed nature of the distributed optical fibre sensor, in which acoustic vibration and other measurands are detected as functions of distance along the optical waveguides from the intrinsic material of the waveguides, and without using any further structures written into or incorporated within that material such as Bragg gratings, can also be implemented in a number of ways, including as a frequency domain, a correlation domain, or a tunable wavelength interrogation system. Such arrangements are discussed for example in "*A Review of Hybrid Fiber-Optic Distributed Simultaneous Vibration and Temperature Sensing Technology and Its Geophysical Applications*" by Khalid Miah and David K. Potter, in Sensors 2017, 17, 2511; doi:10.3390/s17112511 and also in "*Recent Progress in Distributed Fiber Optic Sensors*" by Xiaoyi Bao and Liang Chen, in Sensors 2012, 12, 8601-8639; doi:10.3390/s120708601. However, embodiments described below will focus, for the purposes of clarity, in particular on the use of phase-sensitive optical time domain reflectometry (PS-OTDR) techniques, in which probe light pulses are launched into each optical waveguide, each pulse being sufficiently coherent that the detected backscatter signal from a single probe light pulse contains or is dominated by self-interference between different parts of the same pulse. Such techniques are discussed in WO2008/056143 which is hereby incorporated by reference for these and all other purposes. The resulting coherent Rayleigh backscatter leads to a temporal speckle pattern of interference fringes at the detector, which may be referred to as a coherent Rayleigh backscatter interference signal. This interference signal from the detector, for a particular probe light pulse in a particular one of the optical waveguides, then represents a time series of intensity of the detected coherent Rayleigh backscatter interference which corresponds to position along the optical waveguide.

In order to detect acoustic vibration or one of the other measurands at a particular position along the common path, the temporal development of the interference signal, for a particular round trip time delay out to and back from that position, is followed over a series of probe light pulses. The round trip time for a probe light pulse to the end of a 1000 m long waveguide and back to the interrogator is about 10 microseconds, so that a pulse repeat rate into an optical waveguide of that length of up to about 100 kHz could be used without the backscatter from a later pulse mixing at the detector with the backscatter from an earlier pulse. Temporal variations at acoustic frequencies, for example above about 1 Hz or 10 Hz, in the interference signal for a particular position along one or more of the optical waveguides may therefore be used to determine a corresponding acoustic vibration signal from those one or more waveguides. Various techniques for improving the determination of such acoustic vibration signals from interference signals are described for example in WO2012/063066, the contents of which are incorporated herein for these and all other purposes.

In the arrangement of FIG. 1 and other arrangements described herein, such techniques may be used to determine acoustic vibration as a function of distance along the path, using interference signals from one or more of the optical waveguides.

While acoustic vibration can be detected as described above using higher frequency variations in the interference signals, slower variations in the coherent Rayleigh or other interference signals for a particular position along the path can be used to determine other measurands at that position from changes in optical path length induced by those measurands.

Hydrostatic or static pressure at the optical waveguides at a particular position along the path can have an effect on the local optical path length due both to changes in the physical length of the optical waveguide resulting from the pressure, and due to stress induced changes in the refractive index of the material of the waveguide. Temperature at the optical waveguides at the same position along the path can have an effect on the local optical path length due to changes in the physical length of the optical waveguide under thermal expansion and contraction, stress induced changes in the refractive index which arise as a result of changes of temperature, and due to direct effects of temperature on the refractive index.

For a bare and free moving silica optical fibre of a type typically used for telecommunications, distributed optical fibre sensing, and similar applications, the temperature sensitivity in terms of optical path length changes expressed as optical phase, in the wavelength region of around 1500 nm, is approximately minus 100 radians per Kelvin-metre. For a probe light pulse length of 10 metres and a 0.1 Kelvin temperature change the local phase change observed in the interference signal would therefore be expected to be about minus 100 radians.

Similarly, for a bare and free moving optical fibre of the same type, the pressure sensitivity in terms of optical path length changes expressed as optical phase, in the wavelength region of around 1500 nm, is approximately minus 40 radians per MPa-metre. For a probe light pulse length of 10 metres and a 1 MPa (about 10 atmosphere) change the local phase change observed in the interference signal would therefore be expected to be about minus 400 radians.

Since a single optical waveguide such as a core of an optical fibre, responds with a change in optical path length to both temperature and pressure, measuring changes in either temperature or pressure directly from just the interference signal described above is difficult. However, if the interference signal from two or more optical waveguides is available, and these are arranged to have suitably different response characteristics in terms of optical path length change when subject to the same changes in temperature and pressure, then a comparison of the interference signals from these two optical waveguides can be used to separately determine either or both of temperature and pressure.

For example, if optical path length changes at a particular location along the path give rise to interference signal phase shifts of $\Delta\varphi_1$ and $\Delta\varphi_2$, and these path length changes are approximately linear functions of changes in temperature $\Delta T$ and pressure $\Delta P$, the phase shifts can be expressed by the matrix equation:

$$\begin{bmatrix} \Delta\varphi_1 \\ \Delta\varphi_2 \end{bmatrix} = \begin{bmatrix} k_{P1} & k_{T1} \\ k_{P2} & k_{T2} \end{bmatrix} \begin{bmatrix} \Delta P \\ \Delta T \end{bmatrix} \quad (1)$$

In this equation (1), $k_{p1}$ and $k_{p2}$ are the approximately linear phase sensitivities of the first and second optical waveguides to changes in pressure, and $k_{T1}$ and $k_{T2}$ are the approximately linear temperature sensitivities of the first and second optical waveguides to changes in temperature. This matrix equation can be used by the sensor, by measuring the phase changes, to solve for $\Delta T$ and $\Delta P$, as long as the sensitivities matrix is invertible and provides a sufficiently robust solution despite the expected noise in the phase change signals.

The extent to which a sufficiently robust solution can be expected may be expressed for example in terms of a condition number in solving for the target measurands or related parameters, with a low condition number indicating that the solutions are well conditioned. If using the matrix formulation of the problem discussed above, it is then desirable to provide sensitivity coefficients which provide for a matrix which is well conditioned, such that the inverse of the matrix can be computed with good accuracy.

To the extent to which the phase sensitivities to temperature and pressure are not linear, compensation for such effects can be handled for example by making use of piecewise linear models or suitable transformation of variables.

This technique for determining changes in temperature and pressure using two optical waveguides which have different sensitivities to at least one of these measurands, is appropriate where these are the only or main measurands to which the optical waveguides are expected to be responsive, and the construction of the waveguides, their mounting or other aspects of their use may typically be controlled to ensure that this is the case, for example as discussed in more detail below. If sensitivity to a third measurand is expected then a third optical waveguide can be provided, and all three waveguides arranged to have different sensitivities to the three measurands, and similarly for larger numbers of measurands if necessary.

For example, if sensitivity to changes in all three of temperature $\Delta T$, pressure $\Delta P$, and a local static strain $\Delta S$ are expected, then the following equation can be used to solve for all three measurands, where sensitivity coefficients have now been added for a third optical waveguide, and for static strain for each of these waveguides as $k_{s1}$, $k_{s2}$ and $k_{s3}$:

$$\begin{bmatrix} \Delta\Phi_1 \\ \Delta\Phi_2 \\ \Delta\Phi_3 \end{bmatrix} = \begin{bmatrix} k_{P1} & k_{T1} & k_{S1} \\ k_{P2} & k_{T2} & k_{S2} \\ k_{P3} & k_{T3} & k_{S3} \end{bmatrix} \begin{bmatrix} \Delta P \\ \Delta T \\ \Delta S \end{bmatrix} \quad (2)$$

Again, the analyser may be arranged to solve for changes in temperature, pressure and static strain using phase shift determinations from interference signals from each of the three optical waveguides, as long as the waveguides are designed or arranged so that the coefficient matrix of equation 2 is invertible and provides a sufficiently robust solution despite the expected levels of noise in the phase change signals, for example using the condition number ideas already touched on above.

Although the equations (1) and (2) above have been described in terms of determining changes in pressure and temperature, and in terms of determining changes in pressure, temperature and static strain, the same principles may be used more generally to determine one or more measurands of a plurality of measurands for which suitable relationships between optical path length or phase change and those measurands can be determined, using at least the same number of optical waveguides as the number of plurality of measurands.

Although temperature, static pressure, and static strain have been mentioned here, other measurands to which optical waveguides may be suitably sensitive, depending on aspects of their arrangement such as construction, cladding, and mounting, include path shape and torsion, for example of a cable 16 carrying the waveguides.

Importantly, these techniques for determining one or more measurands to which two or more optical waveguides are responsive, can be used in combination with the same interference or other spectral information measured by the detector 24 for this purpose to also detect acoustic vibration.

The two or more optical waveguides may also have different sensitivities in terms of optical path length or phase change in response to vibration, for example as a result of design implementations intended to cause the optical waveguides to respond differently from each other for same changes of the other measurands. If sensitivities of each of two optical waveguides to a vibration field V are denoted $k_{v1}$ and $k_{v2}$ then the overall phase shifts arising from pressure, temperature and vibration of the environment on the optical waveguides can be expressed as:

$$\begin{bmatrix} \Delta\Phi_1 \\ \Delta\Phi_2 \end{bmatrix} = \begin{bmatrix} k_{P1} & k_{T1} \\ k_{P2} & k_{T2} \end{bmatrix} \begin{bmatrix} \Delta P \\ \Delta T \end{bmatrix} + \begin{bmatrix} k_{V1} \\ k_{V2} \end{bmatrix} V \quad (3)$$

Note that the vibration sensitivities may vary quite strongly with frequency, even though this is not stated in equation (3).). Any significant differences between $k_{v1}$ and $k_{v2}$ might be used to assist in detecting and correcting fringe counting errors during recovery of the vibrationally induced optical phase changes for determining a measure of the vibration.

From equation (3) it can be seen that lower frequency components of the phase changes may be separated in the analyser 30 using a suitable combination of signal averaging, down-sampling and filtering in order to improve the signal to noise ratio before calculation of pressure and/or temperature changes, by inverting the lower frequency $\Delta T$ and $\Delta P$ part of the equation. Higher frequency components of the phase changes may be filtered from the lower frequency parts in the analyser and used to solve equation (3) to obtain a measure of vibration V.

Some ways in which the phase sensitivity of optical waveguides, such as optical fibres, to changes in pressure, including static pressure, can be controlled, are described for example in G. B. Hocker, "Fiber optic acoustic sensors with composite structure: an analysis", *Applied Optics*, vol. 18, no. 21, 1979, which describes embedding optical fibres in different elastic materials leading to controlled increases in pressure sensitivity in the range of 10-100 times over that of a bare fibre.

N. Lagakos et al. "Temperature-induced optical phase shifts in fibers", *Applied Optics*, vol. 20, no. 13, 1981 similarly describes similar effects for controlling the phase sensitivity of optical waveguides such as optical fibres to changes in temperature, for example using cladding layers of silicone and a polyester plastic.

Y-Ching Yang, *Optical Engineering*, vol. 40, no. 10, 2001, describes the combined optical effects of axial strain, thermal loading, and hydrostatic pressure in tightly jacketed double-coated optical fibres, where an optical fibre is coated by two or three layers of polymeric coatings.

Such research has demonstrated and made increasingly possible to predict the effects of different environmental influences such as pressure and temperature on the phase sensitivity of optical fibres and other optical waveguides due to parameters such as thickness, thermal expansion coefficient, Poisson's ratio and Young's modulus of coating layers. Variations in phase sensitivity of more than an order of magnitude can be achieved, and if necessary suitable experiments can easily be carried out with various coating structures in order to determine combinations of features which provide the required response characteristics in terms of optical path length changes to any of the other measurands such as changes in temperature and pressure to which sensitivity is desired and to be controlled.

Therefore, more generally, embodiments of the present invention may use two or more optical waveguides each provided using an optical fibre provided with different coatings, the coatings being provided such that at least one of the measurands such as changes in temperature, pressure or static strain, results in changes in optical path length which are different for each of two or more of the optical waveguides, thereby providing each optical waveguide with a suitable response characteristic to each measurand.

Typically, each different coating may comprise a layer of a single material, or a combination of two or more layers of different materials. The coatings may typically be polymers, with examples of suitable polymer materials being polyester materials such as Hytrel®, which has a coefficient of thermal expansion of about $1.8 \; 10^4 \; K^{-1}$ and a tensile modulus in the region of 0.18 GPa, and a polyetherketone (PEEK) material, which has a coefficient of thermal expansion of about $4.7 \; 10^{-5} \; K^{-1}$ and a tensile modulus in the region of 3.6 GPa. Other suitable materials include other polymers and resilient materials such as polyimides and acrylates, with such materials typically having a tensile modulus considerably lower than that of the material of the optical waveguide itself, which may typically be a silica glass fiber.

The thicknesses of the layers, as well as the materials of the layers, can be controlled to provide the required coefficients of response to the measurands for example as required to solve the equations (1) and (2) above. Usually, each coating or layer will extend along the full length of the optical waveguide or optical fibre, or at least along the full length of the path for which the one or more measurands are to be determined. In this way, a consistent response along the length of the path can be provided in terms of interference phase changes to particular measurands, although if the coatings, layers or responses are not sufficiently consistent then suitable testing and calibration of the sensor may be used to compensate for this.

Figure 2:
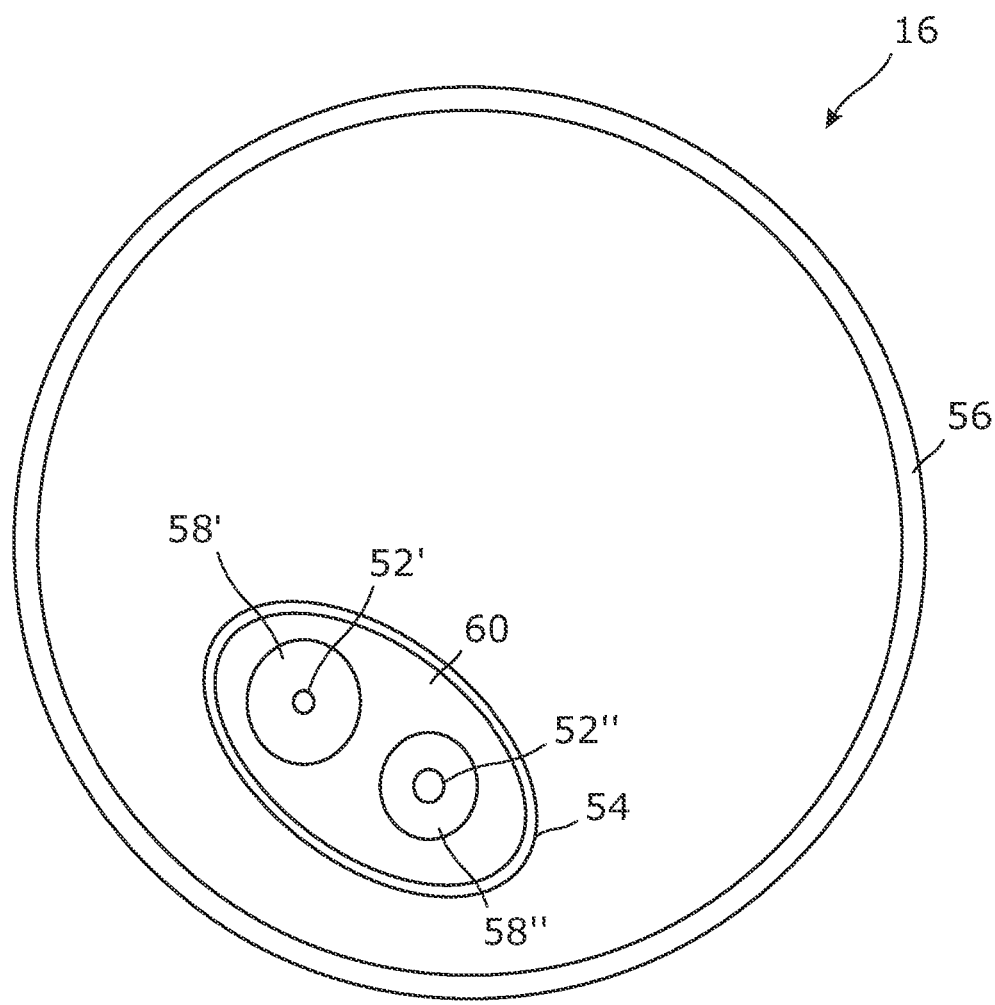
FIG. 2 shows a cross section through a cable containing optical waveguides which can be used in the sensor of FIG. 1.

The multiple optical waveguides may be suitably disposed in a cable 16 or other structure which then extends along the path to be monitored. A suitable design for such a cable is depicted in FIG. 2. Two silica-based sensing fibres 52' and 52", each about 0.125 mm in diameter, are disposed within a thin walled, elliptical, gel filled, loose tube 54 helically wound within a cable structure having a cable wall 56 typically provided by a plastic sheath. The loose confinement and helical winding help to isolate the fibres 52', 52" from stress along the axis of the cable, while the mechanical deformability of the elliptical thin wall of the loose tube 54 and incompressibility of the filling gel 60 of the tube promote transmission of static or hydrostatic pressure to the fibres 52', 52" while also helping to equalize their temperature.

Although various coatings and other arrangements may be used to ensure suitably differing responses of the optical fibres to measurands, in one arrangement a first of the fibres 52' is provided with a coating 58' to a diameter of 0.5 mm with a polyester material such as Hytrel, which has a coefficient of thermal expansion of about $1.8 \; 10^4 \; K^{-1}$ and a tensile modulus in the region of 0.18 GPa. The second fibre 52" is provided with a coating 58" to a diameter of 1.4 mm with a polyetherketone (PEEK) material, which has a coefficient of thermal expansion of about $4.7 \; 10^{-5} \; K^{-1}$ and a tensile modulus in the region of 3.6 GPa. The differing material properties and coating thicknesses are chosen to provide contrasting responses to temperature and pressure as discussed above.

The cable may also contain an axial strength member and a variety of other elements not illustrated in FIG. 2 or described in detail here such as electrical conductors and other optical fibres, packing and filler materials such as Kevlar fibres.

Using the arrangement of FIG. 2 to provide the optical waveguides 12', 12" of a sensor such as that of FIG. 1, different optical phase changes would be produced in each waveguide by the common environment, due to the design of the optical waveguides and their coatings, and these different responses would be used to determine at least one of the pressure and temperature measurands as discussed above, along with a determination of acoustic vibration. A more detailed implementation of the arrangement of FIG. 1 suitable for implementing such as sensor is depicted in FIG. 3.

Figure 3:
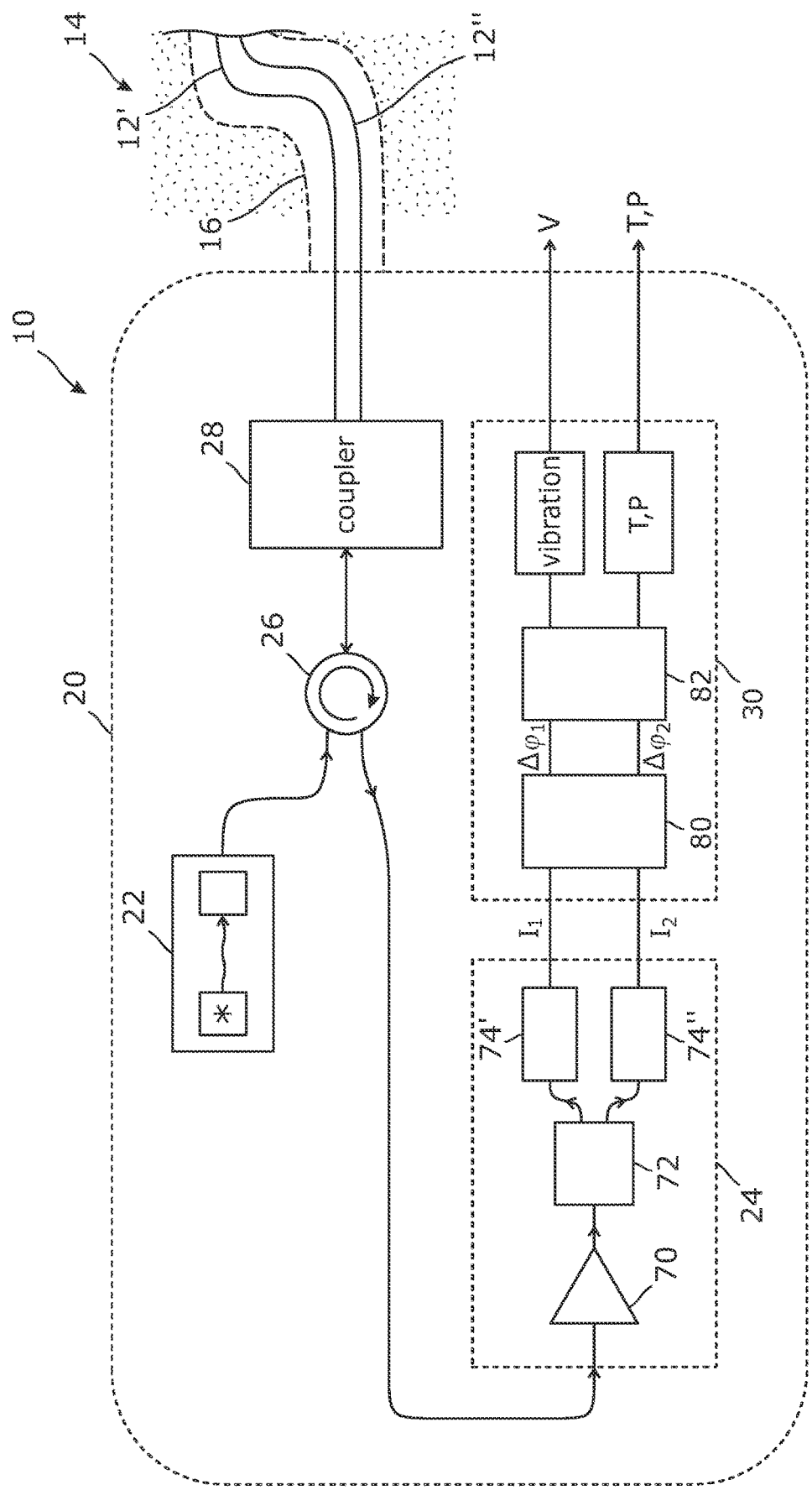
FIG. 3 illustrates more detailed aspects which can be used in the detector and analyser parts of the sensor of FIG. 1.

In FIG. 3 the depiction of the probe light source 22, the circulator 26. the coupler 28 and the sensing cable 28 are the same as in FIG. 1. However, the detector 24 is now shown in more detail as comprising an optical amplifier 70 receiving the backscattered light from the circulator 26, and a demultiplexer 72 arranged to demultiplex the backscattered light from each of the optical waveguides of the cable 28 to separate detector units 74', 74" each of which may comprise suitable conditioning optics and detector elements such as photodiodes.

The interference signals $I_1$, $I_2$ from each detector unit are then separately forwarded to the analyser 30 where each is passed to a phase recovery processor 80 for detection and tracking of phase changes within each interference signal, denoted above for example as $\Delta\varphi_1$ and $\Delta\varphi_2$. The phase recovery processor may be implemented, for example, by methods such as those disclosed in "Strain sensing based on coherent Rayleigh scattering in an optical fibre" by R. Posey Jr., G. A. Johnson and S. T. Vohra in Electronics Letters, 28th September 2000 Vol. 36 No. 20, p 1688/9.

The separate phase change parts of the interference signals for each of the optical waveguides are then forwarded to a signal band splitter 82 for deriving higher frequency parts of the phase changes $\Delta\varphi_{1H}$ and $\Delta\varphi_{2H}$, for use in determining acoustic vibration, and lower frequency parts of the phase changes $\Delta\varphi_{1L}$ and $\Delta\varphi_{2L}$, for use in determining the other measurands. This frequency division may be made using suitable band pass filters, and the frequency components contributing to the higher and lower frequency parts may be separate, for example being defined as above and below one or more thresholds, or may overlap to some extent. For example, the low frequency signals could comprise frequency components at or below 1 Hz, and the high frequency signals at or above 1 Hz, or some other division for example 1 Hz and 10 Hz, 3 Hz and 3 Hz etc.

The higher frequency signals $\Delta\varphi_{1H}$ and $\Delta\varphi_{2H}$ are then passed to a vibration signal processor 84 of the analyser 30 for determination of one or more measures of vibration from these signals, although note that just one or both of these signals could be used for this purpose, and vibration could be determined from both subject to a consideration of the different sensitivities and frequency responses of the optical waveguides to such vibration. A corresponding vibration signal Vis then be output by the analyser, representing determined vibration as a function of time and distance along the path of the optical waveguides.

The lower frequency signals $\Delta\varphi_{1L}$ and $\Delta\varphi_{2L}$ are similarly passed to a temperature and pressure signal processor 86 of the analyser 30 for determination of temperature and pressure from these signals as discussed above. Corresponding temperature T and pressure P signals are then output by the analyser.

Note that in other embodiments, the temperature and pressure signal processor 86 of the analyser could be a measurand signal processor arranged to determine any one or more other measurands as described above, including for example one or more of temperature, pressure, strain, and so forth. To this end, although FIG. 3 illustrates an embodiment of the sensor in which there are two optical waveguides, two detector units 74', 74", and where the phase recovery processor 80 outputs phase change parts of the interference signals for each of the two optical waveguides, this or similar arrangements can also be provided where there are three or more optical waveguides, three or more corresponding detector units if required, and in which the phase recovery processor 80 outputs separate phase change parts of the interference signals for each of the three or more optical waveguides. The signal band splitter 8 would then also output three or more high frequency signals, and three or more low frequency signals if required.

Using such arrangements, the analyser 30 may be arranged to output for example one or more of temperature, pressure and strain, or some combination of these or other measurands other than vibration. Note that in the arrangement of FIG. 3 and variations of this discussed above, depending on the optical waveguide multiplexing schemes used, it may not be necessary to provide a separate detector unit for each waveguide.

Figure 4:
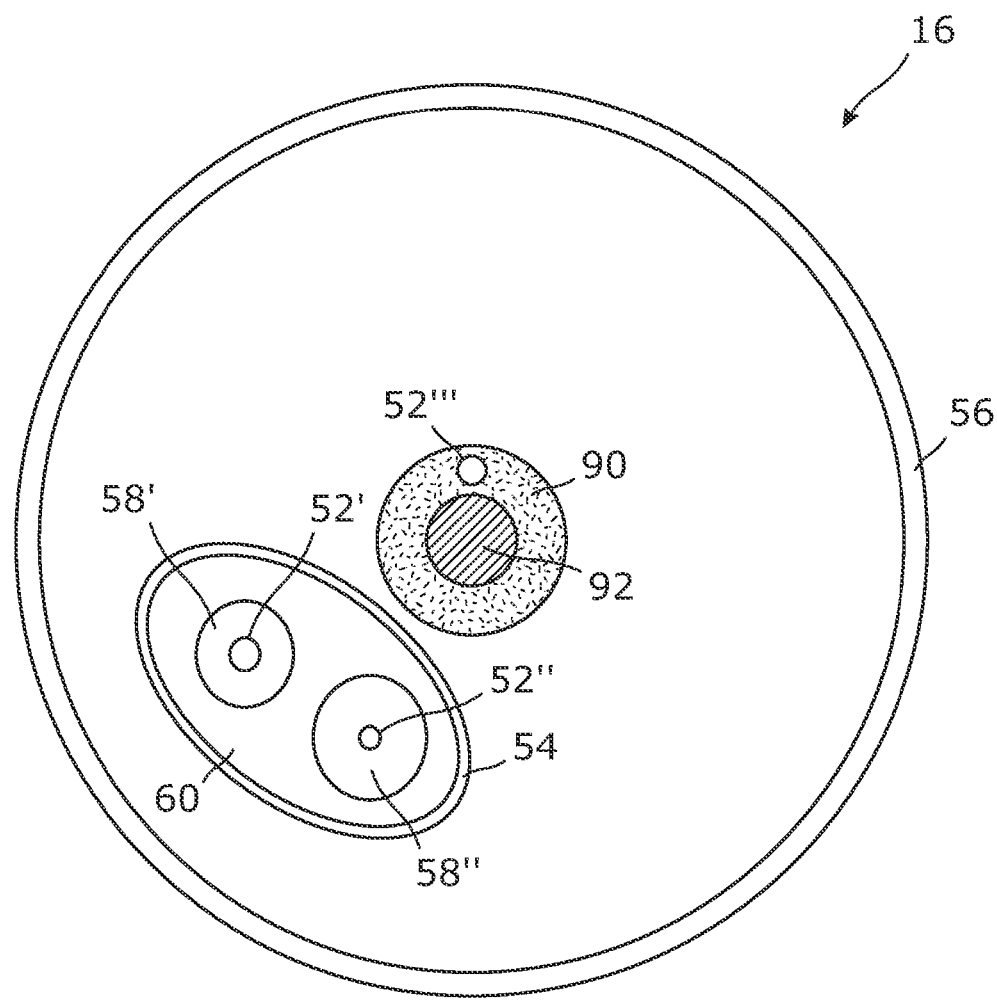
FIG. 4 shows an alternative cable structure in which an additional strength member and optical waveguide are shown.

FIG. 2 illustrates a cable 16 arrangement suitable for detecting temperature and/or pressure, with both of the optical waveguides being isolated from overall elongation or strain of the cable 16. In order to provide a sensor capable of detecting three separate measurands such as temperature, static pressure, and static strain, FIG. 4 illustrates an alternative cable structure in which, as for FIG. 2, two silica-based sensing fibres 52' and 52", each about 0.125 mm in diameter, are disposed within a thin walled, elliptical, gel filled, loose tube 54 helically wound within a cable structure having a cable wall 56. An additional silica-based sensing fibre 52''' also with a diameter of about 0.125 mm is now also provided, bonded using a tight encapsulant 90 to a strength member 92 extending along the cable. The additional sensing fibre 52''' may be provided with a coating of a polyimide material some 0.155 mm in diameter (not shown in the figure). Because it is fixed to the strength member 92 and disposed with its axis parallel to the strength member, it experiences the full axial strain on the cable 16, unlike those optical fibres 52' and 52" contained within the helically wound loose tube, thereby providing a strong contrast between the strain response coefficients of the optical fibre 52''' and the optical fibres 52' and 52".

The cable of FIG. 4 may also contain further elements not illustrated or described in detail here such as electrical conductors and other optical fibres, packing and filler materials such as Kevlar fibres.

Using a cable arrangement such as that of FIG. 4 in which one or more of the optical waveguides is less isolated from axial strain may also enhance the sensitivity of one or more of the optical waveguides to vibration, for example compared to the loose tube arrangement of FIG. 2. Various other structures and arrangements could be used to achieve different sensitivities of the optical waveguides to axial strain involving for example cable structure, different helical angles and indeed different helical axes for different optical waveguides in the same cable structure, different materials and thicknesses of fibre coatings, different materials used for embedding the optical waveguides and other cable structures, changes in cable geometry, cladding, cross sectional form and so on.

While embodiments of the invention have been described above partly in terms of separate optical fibres with responses controlled by symmetrical coating and cable structures, similar capabilities might be achieved by using dissimilar optical waveguide cores within a single optical fibre. For example, different doping materials such as germanium and phosphorus can be used in differing quantities to create waveguide cores with different mechanical properties, particularly in terms of thermally induced stress.

Likewise, differently doped non-waveguide regions could be incorporated into an optical fibre, such as boron doped stress applying regions that would also strongly influence the thermal stress distribution within the cross section of the fibre.

Apart from using doping techniques, different optical waveguiding mechanisms can also be employed to generate differences in thermal, strain and pressure responses. For example, photonic crystal and microstructured optical fibres can be designed to offer a wide range of properties suitable for providing the different response characteristics required to implement the described invention.

Furthermore, asymmetric coatings could be used to provide differing responses from otherwise similar or identical optical fibre waveguide cores, within a multi-core optical fibre. For example, a nominally circular fibre coating might contain a metallic wire or a void on one side of a two-core fibre adjacent to one of the cores, thereby introducing differing thermal and pressure responses for the cores.

Therefore, although specific embodiments of the invention have been described with reference to the drawings, the skilled person will be aware that variations and modifications may be applied to these embodiments without departing from the scope of the invention defined in the claims.

The invention claimed is:

1. A distributed optical fiber sensor arranged to detect acoustic vibration and a first of other measurands, comprising:
   first and second optical waveguides extending proximally to each other along a common path through an environment;
   a probe light source to deliver probe light to the first and second optical waveguides for generating backscattered light within the first and second optical waveguides;
   a detector to detect, as functions of distance along the common path, interference signals in the backscattered light resulting from changes in optical path length along the first and second optical waveguides arising from the acoustic vibration and the other measurands;
   a filter to filter the interference signals to provide higher frequency signals and lower frequency signals; and
   an analyzer to determine from the interference signals, as functions of distance along the common path, the acoustic vibration using the higher frequency signals, and determine the first other measurand using the lower frequency signals,
   wherein the first and second optical waveguides have optical path length response characteristics, the optical path length response characteristics of the first optical waveguide being different from the optical path length response characteristics of the second optical waveguide for at least one of the other measurands, and
   wherein the analyzer is to determine the first other measurand using differences between the lower frequency signals from each of the first and second optical waveguides.

2. The distributed optical fiber sensor of claim 1, wherein the other measurands comprise two or more of changes in temperature, changes in static pressure, and changes in static strain.

3. The distributed optical fiber sensor of claim 1, wherein the first other measurand comprises one of static pressure compensated for temperature effects on changes in the optical path length, and temperature compensated for static pressure effects on the changes in the optical path length.

4. The distributed optical fiber sensor of claim 1, wherein the optical path length response characteristics of each of the first and second optical waveguides to the at least one other measurand are linear over an operating range of the distributed optical fiber sensor, and described by a response coefficient, and wherein the response coefficient of the first optical waveguide is different from the response coefficient of the second optical waveguide.

5. The distributed optical fiber sensor of claim 1, wherein the analyzer determines the acoustic vibration and the first other measurand, as functions of distance along the common path, from interference phases in the interference signals.

6. The distributed optical fiber sensor of claim 5, further comprising:
   a phase recovery processor to determine the interference phases in the interference signals.

7. The distributed optical fiber sensor of claim 1, wherein the other measurands are related to properties of the interference signals from the first and second optical waveguides.

8. The distributed optical fiber sensor of claim 1, wherein the first and second optical waveguides are provided as waveguides within one or more optical fibers.

9. The distributed optical fiber sensor of claim 1, wherein the first and second optical waveguides are provided as multiple waveguides within a single optical fiber.

10. The distributed optical fiber sensor of claim 1, wherein the optical path length response characteristics of the first optical waveguide to the first other measurand are different from the optical path length response characteristics of the second optical waveguide to the first other measurand.

11. The distributed optical fiber sensor of claim 1, wherein the first and second optical waveguides are provided using first and second optical fibers having different coatings.

12. The distributed optical fiber sensor of claim 11, wherein each coating comprises a layer of a single material, or a combination of two or more layers of different materials.

13. The distributed optical fiber sensor of claim 12, wherein the materials are polymers.

14. The distributed optical fiber sensor of claim 12, wherein each of the two or more layers is of a predefined thickness.

15. The distributed optical fiber sensor of claim 11, wherein each of the different coatings of the first and second optical fibers extends a full length of the common path.

16. The distributed optical fiber sensor of claim 11, wherein the first and second optical fibers are housed within a loose tube.

17. The distributed optical fiber sensor of claim 16, wherein the loose tube has an elliptical cross section.

18. The distributed optical fiber sensor of claim 16, wherein the loose tube is filled with a gel disposed around the first and second optical fibers.

19. The distributed optical fiber sensor of claim 16, wherein the loose tube is helically wound within a cable extending along the common path.

20. The distributed optical fiber sensor of claim 19, wherein the cable further comprises a strength member extending along the cable and at least one of the first and second optical waveguides is not disposed within the loose tube but is coupled to the strength member.

21. The distributed optical fiber sensor of claim 1, wherein the interference signals are Rayleigh backscatter interference signals.

22. A distributed optical fiber sensor to separately detect temperature, hydrostatic pressure and acoustic vibration as functions of distance along a path of first and second optical fibers extending proximally to each other along a common path through an environment, using backscattered light from within the first and second optical fibers, by providing that the first and second optical fibers are arranged to provide distinctly different interference responses to at least one of the temperature and the hydrostatic pressure, filtering the distinctly different interference responses to provide higher frequency signals and lower frequency signals, determining the acoustic vibration using the higher frequency signals, and determining the temperature and the hydrostatic pressure using the lower frequency signals.

23. The distributed optical fiber sensor of claim 22, wherein the distributed optical fiber sensor is to cross compensate the detection of the temperature and the hydrostatic pressure using the distinctly different interference responses of the first and second optical fibers.

24. The distributed optical fiber sensor of claim 23, wherein the distinctly different interference responses of the first and second optical fibers are provided by using different coatings on the first and second optical fibers.

25. A method of operating a distributed optical fiber sensor to detect acoustic vibration and a first of other measurands, comprising:
provided first and second optical waveguides extending proximally to each other along a path through an environment, each optical waveguide having a response characteristic to at least one of the other measurands, wherein the response characteristic to the at least one other measurand of the first optical waveguide is different from the response characteristic to the at least one other measurand of the second optical waveguide;
delivering probe light to the first and second optical waveguides for generating backscattered light within the first and second optical waveguides;
detecting, as functions of distance along the path, interference signals in the backscattered light resulting from changes in the first and second optical waveguides arising from the acoustic vibration and the other measurands;
filtering the interference signals to provide higher frequency signals and lower frequency signals;
determining the acoustic vibration, as a function of distance along the path, using the higher frequency signals; and
determining the first other measurand, as a function of distance along the path, from the lower frequency signals, using differences between the lower frequency signals from each of the first and second optical waveguides.

26. The method of claim 25, wherein the other measurands comprise two or more of changes in temperature, changes in pressure, and changes in strain.

27. The method of claim 25, wherein the interference signals are Brillouin spectral shift signals in the backscattered light resulting from the changes in optical path length along the first and second optical waveguides arising from the acoustic vibration and the other measurands, and the response characteristics of the first and second optical waveguides are Brillouin spectral shift response characteristics.

28. The method of claim 25, wherein the interference signals are coherent Rayleigh scattering interference signals in the backscattered light resulting from the changes in optical path length along the first and second optical waveguides arising from the acoustic vibration and the other measurands, and the response characteristics of the first and second optical waveguides are different optical path length response characteristics.

29. The method of claim 28, wherein the acoustic vibration is determined from higher frequency changes in optical phases of the interference signals, and the first other measurand is determined from lower frequency changes in the optical phases of the interference signals.

30. The method of claim 25, wherein the first and second optical waveguides are provided by first and second optical fibers, and the response characteristics of the first and second optical waveguides in the first and second optical fibers are provided at least in part by providing different coatings on the first and second optical fibers.

* * * * *